United States Patent
Guermont et al.

(10) Patent No.: US 11,347,981 B2
(45) Date of Patent: May 31, 2022

(54) FLATBED PRINTER AND A METHOD OF MEDIA-RELATIVE IMAGE POSITIONING FOR THE FLATBED PRINTER

(71) Applicant: Canon Production Printing Holding B.V., Venlo (NL)

(72) Inventors: Jérôme O. R. Guermont, Venlo (NL); Antonius G. Van Rooijen, Venlo (NL); Derya Özçelik-Buskermolen, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 17/151,861

(22) Filed: Jan. 19, 2021

(65) Prior Publication Data

US 2021/0241054 A1 Aug. 5, 2021

(30) Foreign Application Priority Data

Feb. 2, 2020 (EP) .................................... 20158621

(51) Int. Cl.
*G06K 15/02* (2006.01)
*G06K 15/00* (2006.01)
*G06F 3/12* (2006.01)

(52) U.S. Cl.
CPC ....... *G06K 15/1807* (2013.01); *G06F 3/1204* (2013.01); *G06F 3/1205* (2013.01);
(Continued)

(58) Field of Classification Search
CPC ............. G06K 15/1807; G06K 15/002; G06K 15/1885; G06F 3/1242; G06F 3/1282; G06F 3/1256
See application file for complete search history.

(56) References Cited

U.S. PATENT DOCUMENTS

2010/0214584 A1* 8/2010 Takahashi ............ H04N 1/0044
358/1.9
2011/0199629 A1* 8/2011 Sensu ................ H04N 1/00442
358/1.13

(Continued)

OTHER PUBLICATIONS

European Search Report, issued in Application No. 20 15 8621, dated Aug. 20, 2020.

*Primary Examiner* — Nicholas Pachol
(74) *Attorney, Agent, or Firm* — Birch, Stewart, Kolasch & Birch, LLP

(57) ABSTRACT

A flatbed printer and a method for a flatbed printer are disclosed. The flatbed printer includes a print controller configured to receive a digital image intended to be printed by the flatbed printer, to receive position information entered by a parameter window of the user interface of the position of the image on the flatbed area, to receive an indication entered by the parameter window that the image has to be positioned on the media piece, to open the parameter window for entry of a set of parameters allowing to define a size of the media piece and a position of the media piece on the flatbed surface, and the image position relative to the media piece, to receive the entered set of parameters, to show the media piece and the image on the flatbed area in the preview window, and, when moving the media piece or the image over the flatbed area in the preview window, the relative position of the image with respect to the media piece is preserved.

11 Claims, 7 Drawing Sheets

(52) U.S. Cl.
CPC .......... *G06F 3/1242* (2013.01); *G06F 3/1256* (2013.01); *G06F 3/1282* (2013.01); *G06K 15/002* (2013.01); *G06K 15/1885* (2013.01)

(56) References Cited

U.S. PATENT DOCUMENTS

| | | | |
|---|---|---|---|
| 2017/0368850 A1* | 12/2017 | Eveilleau | B41J 11/0085 |
| 2019/0004757 A1* | 1/2019 | Ohta | G06F 3/1257 |
| 2019/0361649 A1 | 11/2019 | Hori | |
| 2019/0364157 A1* | 11/2019 | Ohta | G06F 3/1204 |
| 2019/0384549 A1* | 12/2019 | Miyasaka | G06F 3/1208 |
| 2019/0384551 A1* | 12/2019 | Miyasaka | H04N 1/0044 |
| 2020/0210117 A1* | 7/2020 | Miyasaka | G06F 3/1204 |
| 2020/0409637 A1* | 12/2020 | Hori | G06F 3/1205 |
| 2021/0016562 A1* | 1/2021 | Noda | B41J 11/008 |
| 2021/0136236 A1* | 5/2021 | Veedu | H04N 1/047 |
| 2021/0200482 A1* | 7/2021 | Hasegawa | G06F 3/1208 |

* cited by examiner

FLATBED PRINTER AND A METHOD OF MEDIA-RELATIVE IMAGE POSITIONING FOR THE FLATBED PRINTER

FIELD OF THE INVENTION

The present invention relates to a flatbed printer comprising a flatbed area for placing media pieces to be printed upon, a print controller for receiving at least one digital image to be printed on a media piece and controlling the printing of the at least one digital image on the media piece, an armature constructed to move over the flatbed area in at least one direction, a print head attached to the armature and configured to eject recording material on the media piece, and a user interface comprising a preview window and a parameter window, wherein the print controller is configured to receive a digital image intended to be printed by the flatbed printer.

The present invention also relates to a method for media-relative image positioning for a flatbed printer.

The present invention further relates to a non-transitory recording medium comprising computer executable program code configured to instruct a computer to perform the method according to the invention.

The print head of the flatbed printer may be mounted on an armature above the flatbed area. The armature may a robot arm to which the print head is attached. The robot arm may move in a plurality of directions over the flatbed area. The armature may be a gantry moving over the flatbed area in a first direction, while the print head is movable along the gantry in a second direction perpendicular to the first direction. In case of a print head having a same width as the flatbed area, the armature may be moving in one direction over the flatbed area, i.e. the first direction. The control unit is connected to the print head for controlling the print head. The control unit is controlling the movement of the print head over the flatbed area and the ejection of recording material towards the flatbed area. The control unit is connected to the print head for controlling the print head height with respect to the flatbed area. The distance from the print head to the flatbed area may be variable in order to allow the printing of pieces of media of different thicknesses.

The recording material may be ink, e.g. a UV curable ink. When a UV curable ink is used, the print head is also provided with UV lamps for curing the recording material when ejected on the piece of media placed on the flatbed area. The flatbed area usually has the form of a rectangle, for example of a width of 1.22 m and a length of 1.22 m, or of a width of 1.22 m and a length of 2.44 m.

A piece of media with dimensions smaller or equal to the dimensions of the flatbed area can be placed on the flatbed area. Even a piece of media with dimensions larger than the dimensions of the flatbed area can be placed on the flatbed area and has to be moved to get it completely printed.

Flatbed print systems usually apply recording material, like colorants, on a piece of media placed on the flatbed area in the form of ink according to a digitally defined, two-dimensional pattern of pixels with values that indicate a composition of these colorants. This pattern is generated out of a digital image, that may comprise objects in either vectorized or rasterized format, using conventional techniques like interpretation, rendering, and screening by a raster image processor. The processing of a digital image includes color management to convert color values of the pixels in the digital image into composition values related to the printer color space as is set up by the colorants of the print system. Depending on the intended print quality a print mode may be selected to influence the characteristics of the print process. According to the selected print mode the pixels of the pattern may be printed in a corresponding resolution and in more than one pass, wherein a position of the piece of media on the flatbed area has an opportunity to receive a colorant in one or more of the passes of the print head across the flatbed area. An image to be printed may be delivered to the flatbed printer comprised in a print job which may be submitted by a user or an operator from a work station coupled to the flatbed printer via a digital network connection.

Print jobs may also contain images which have to be printed in multiple layers. For example a first white layer is deposited as a background, a second color layer is deposited as a color image to be established and a third varnish layer is deposited in order to protect the second layer.

BACKGROUND OF THE INVENTION

An operator may place pieces of media on the flatbed area in order to print images from a plurality of print jobs on the pieces according to digital images which have been offered to the control unit by means of submitted print jobs. Positioning of a piece of media must be done very accurate with respect to its position and orientation. The operator usually measures right-angled distances of the piece of media from the edges of the flatbed area by a measuring tool like a measuring cord, a tape-measure or a ruler. The operator enters the measured distances by means of an application running on a computer connected to the control unit of the flatbed printer or on the print controller itself. After entering the distances, the operator selects the digital image to be printed on the piece of media and start the printing of the flatbed printer. Therefore the print controller or the computer is provided with a user interface suitable for data entry in general.

Another method to position the media is to align the piece of media with reference rulers which have been printed on the flatbed area beforehand. Another usage of directly printing on the flatbed area is for highlighting vacuum zones which are underneath the surface of the flatbed area so that the operator knows what areas to use, mask, or turn on or off. A vacuum zone is connected to a plurality of suction holes in the flatbed area.

Traditionally on a flatbed printer, a printing position of an image is defined relative to the flatbed surface, without any information on the media size and position.

The problem is that the operator then has to visualize mentally where the media will be positioned and assess whether the image will be at the right position on the media. This is both tedious and error prone, especially for double-sided job or when printing multiple boards side-by-side.

It is an object of the invention to achieve a method to mitigate the above-mentioned drawbacks of defining the printing position of an image on the media piece.

SUMMARY OF THE INVENTION

According to the present invention this object is achieved by the above-mentioned flatbed printer wherein the print controller is configured to receive position information entered by means of the parameter window of the user interface of the position of the image on the flatbed area, to receive an indication entered by means of the parameter window of the user interface that the image has to be positioned on the media piece, to display in the parameter window a set of parameters allowing to define a size of the media piece and a position of the media piece on the flatbed surface, and the image position relative to the media piece, to receive the entered set of parameters, to show the media piece and the image on the flatbed area in the preview window, and, when moving the media piece or the image over the flatbed area in the preview window or when editing the parameters defining the position of the media piece in the parameter window, the relative position of the image with respect to the media piece is preserved.

The media is then displayed as a digital object with a border in a first color, for example as a white rectangle with a blue border, on the preview window, and the image is displayed as another digital object with a border in a second color, for example a grey border. The operator can now easily verify that the image will be correctly positioned on the media. The operator can now directly read where the media must be positioned. After moving the image to another location on the flatbed area in the preview window, the operator can check that the image position on the media is still correct, without having to perform mental calculations.

According to the invention the image positioning typically becomes a two-steps process of firstly defining the media size and image position on the media piece and secondly defining the media position on the flatbed area.

When dragging the image on the preview window or editing the media piece parameters in the parameter window, the image moves together with the media piece in the preview window. The image position relative to the media piece is preserved.

According to an embodiment of the invention the print controller is configured to receive the image ripped by a raster image processor which has defined an offset for the image with respect to an origin of the flatbed area, and when the indication that the image has to be positioned on the media piece, to automatically infer a media size equal to the size of the image increased with the offset from the origin of the flatbed area, and to position the image at the same offset from a corner of the media piece. When the raster image processor (RIP) sends the image to the printing device, it can define an offset for the image with respect to the origin of the flatbed area (for example a bottom-left corner of the flatbed area). When the operator selects the indication of positioning the image on the media piece by means of the parameter window, the print controller automatically infers a media size equal to the image size+the offset from the flatbed area origin as sent by the RIP, and positions the image at that same offset from the media corner. The operator can then edit the media piece dimensions in the parameter window and adjust the image position on the media piece.

According to an embodiment the print controller is configured to copy the image multiple times, wherein each copy inherits the dimensions of the media piece and the image position on the media piece. This allows easily printing the same image on multiple media pieces side-by-side, with exactly the same image-to-media positioning for each copy.

According to an embodiment the print controller is configured to automatically fill, when the dimensions of the media piece are known, the media piece with multiple copies of the image.

According to an embodiment the print controller is configured to provide feedback on the user interface about images extending outside of the media piece.

The present invention also relates to a printing method for media-relative image positioning for a flatbed printer comprising a flatbed area for placing media pieces to be printed upon, a print controller for receiving at least one digital image to be printed on a media piece and controlling the printing of the at least one digital image on the media piece, an armature constructed to move over the flatbed area in at least one direction, a print head attached to the armature and configured to eject recording material on the media piece, and a user interface comprising a preview window and a parameter window, wherein the method comprises the steps of
    receiving a digital image intended to be printed by the flatbed printer,
    receiving position information entered by means of the parameter window of the user interface of the position of the image on the flatbed area,
    receiving an indication entered by means of the parameter window of the user interface that the image has to be positioned on the media piece,
    displaying in the parameter window a set of parameters allowing to define a size of the media piece and a position of the media piece on the flatbed surface, and the image position relative to the media piece,
    receiving entered values for the set of parameters,
    showing the media piece and the image on the flatbed area in the preview window, and,
    when moving the media piece or the image over the flatbed area in the preview window or when editing the parameters defining the position of the media piece in the parameter window, the relative position of the image with respect to the media piece is preserved.

According to an embodiment the method comprises the steps of receiving the image ripped by a raster image processor which has defined an offset for the image with respect to an origin of the flatbed area, and, when the indication that the image has to be positioned on the media piece is received, automatically inferring a media size equal to the size of the image increased with the offset from the origin of the flatbed area, and positioning the image at the same offset from a corner of the media piece.

According to an embodiment the method comprises the step of copying the image multiple times, wherein each copy inherits the dimensions of the media piece and the image position on the media piece.

According to an embodiment the method comprises the step of automatically filling, when the dimensions of the media piece are known, the media piece with multiple copies of the image.

According to an embodiment the method comprises the step of providing feedback on the user interface about images extending outside of the media piece in the preview window.

The invention also relates to a non-transitory recording medium comprising computer executable program code configured to instruct a computer to perform the method according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
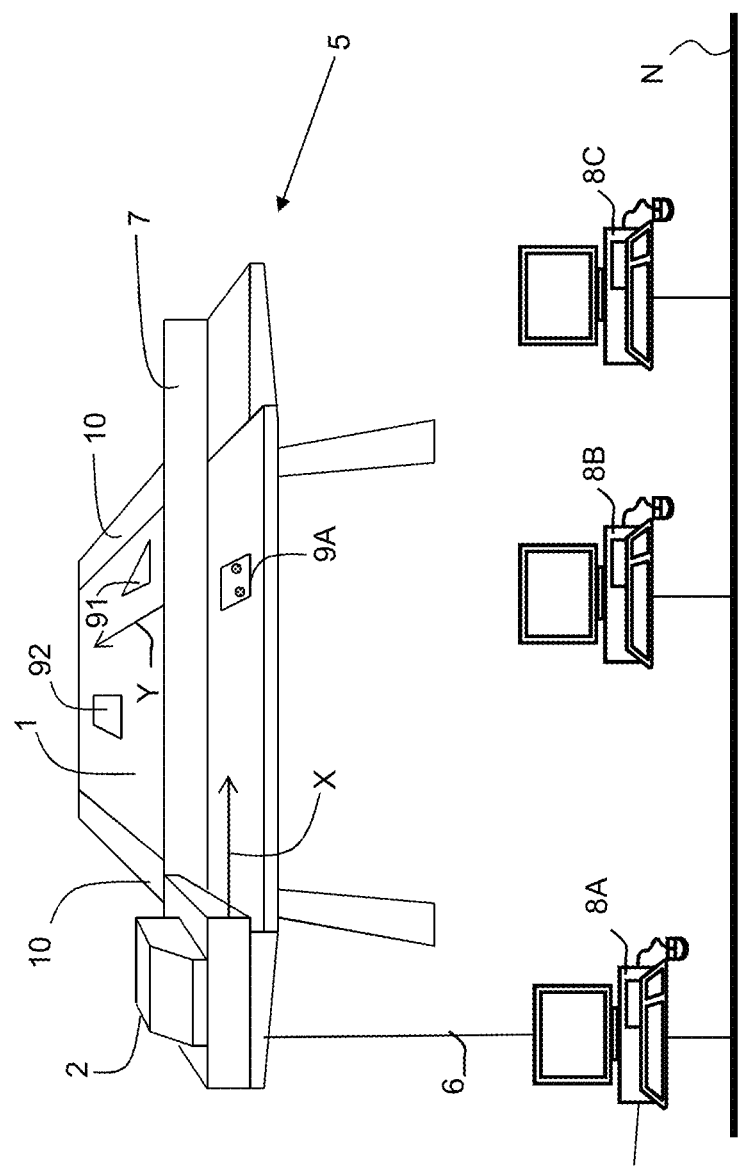
FIG. 1 shows a printing system according to the invention.

FIG. 1 is a print system 5 comprising a number of workstations 8B, 8C, which may be personal computers or other devices for preparing image data for prints to be printed. These workstations have access to a network N for transferring print jobs comprising the image data to a print controller 8A that is configured to receive the print jobs for prints and derive pass images. The print controller 8A may be part of the print system 5 connected to a print controller of the print system 5 via a connection 6. The print system 5 further comprises a print head 2 attached to an armature 7 for applying colorants, for example cyan (C), magenta (M), yellow (Y), black (K) and white (W) colorant, or varnish to pieces 91, 92, 9A of flat print media placed on a flatbed area 1 in order to obtain a printed image. The armature 7 may a gantry above the flatbed area 1 as shown in FIG. 1 or a robot arm (not shown) moving in a plurality of directions over the flatbed area 1. The flatbed area 1 is the surface of the flatbed which is at least partially printable by the print head 2. The pieces of media may be so small that they are completely placed on the flatbed area 1, but a piece of media which is larger than the flatbed area, in which case an image which is going to cover the whole piece of media must be printed into a plurality of parts of the image, is not excluded. A first piece 9A has already been printed upon, while the other pieces 91, 92 are not provided with any recording material yet. The print head 2 reciprocally scans the flatbed area 1 in the second direction X along a gantry 7 perpendicular to a first direction Y of the gantry 7 over the flatbed area 1 along guiding parts 10. During printing of an image on the piece 91, 92, 9A of media, the piece 91, 92, 9A of media is not moved on the flatbed area 1. This way of working is advantageous for rigid print media. A print head which is as wide as the flatbed area may also be envisaged within the scope of the invention. Such a print head may be moveable in at least one direction over the flatbed area 1. The piece of media 9A may have a thickness of 10 mm, while the pieces of media 91, 92 may have a thickness of 20 mm.

Figure 2:
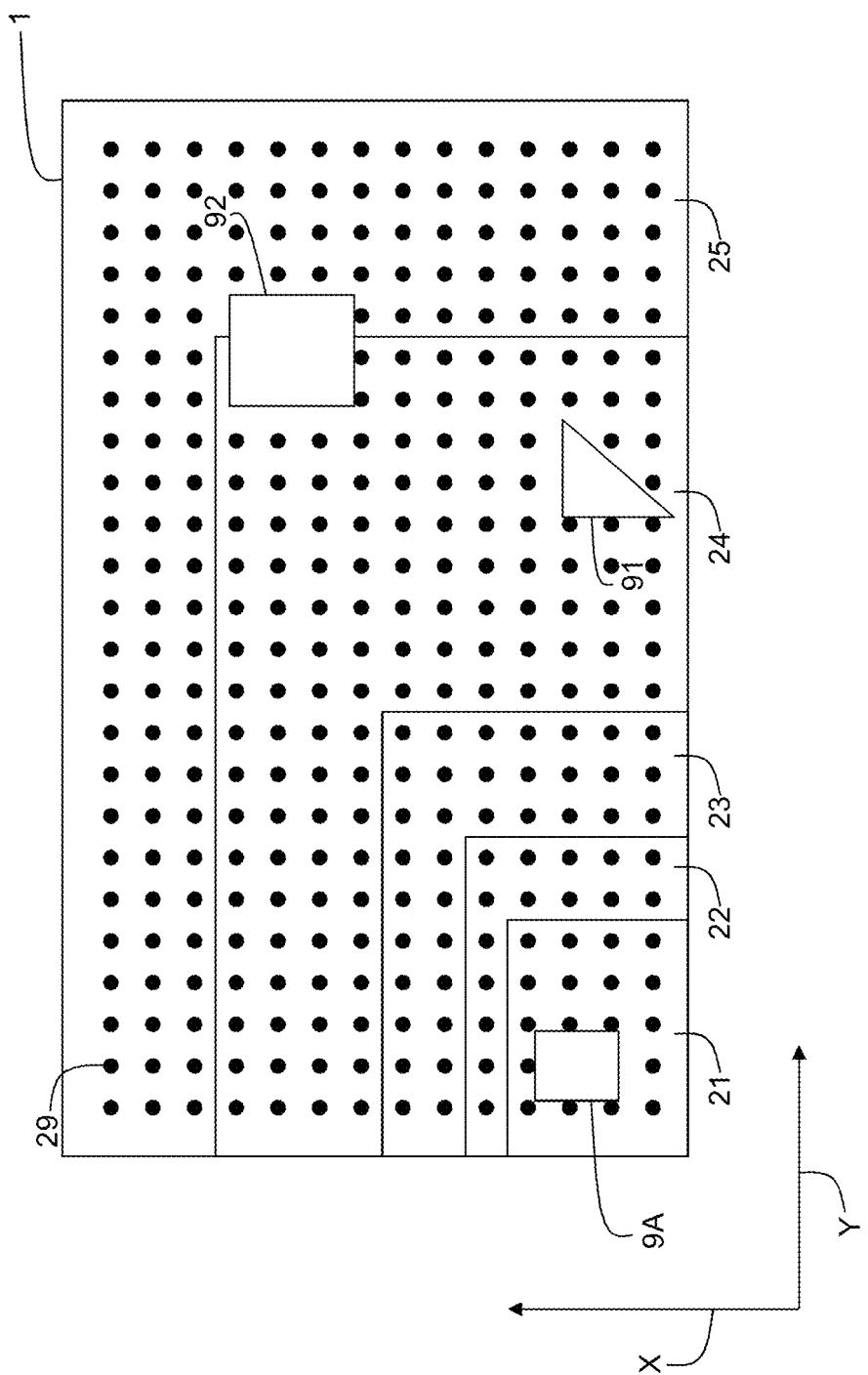
FIG. 2 is a top view of the flatbed area of the printing system in FIG. 1.

FIG. 2 shows the flatbed area 1 of FIG. 1 from a different viewpoint. The flatbed area 1 is provided with a plurality of suction holes 29. A suction hole 29 is connected to at least one underlying suction chamber 21-25. The suction chambers 21-25 may be closed and opened separately in order to limit and/or expand the air flow to an air flow which is necessary and corresponding to the positions of the media pieces 91, 92, 9A on the flatbed area 1. The number of suction holes, the number of suction chambers, the size of the suction holes, the size of the suction chambers, the geometry of the suction holes and the geometry of the suction chambers in FIG. 2 are exemplary. Other numbers, sizes or geometries may be envisioned.

When a print job comprising at least one image to be printed is submitted to the flatbed printer, the print controller adds the print job and the at least one image to a pool of images to be printed. The pool is shown in an initial user interface screen and may be organized as a print queue or as a grouping mechanism to create a container print job with a container image that comprise the images which can be printed in one gang of printing on at least one media piece laid down on the flatbed area. An image from the pool can be selected in order to display the user interface screens as shown in FIGS. 3-6. From the user interface screens as shown in FIGS. 3-6, the user can return to the initial user interface screen (not shown), for example to select a next image which printing is to be specified in the user interface screens in FIGS. 3-6.

According to another embodiment the user interface screens in FIGS. 3-6 are integrated as a sub-screen in the initial user interface screen of the user interface of the flatbed printer. When no print job or image is selected, a placeholder text may be displayed in the sub-screen. A selected image in the pool part of the initial user interface screen is then directly visible in the sub-screen, i.e. in the preview window and the parameter window of the sub-screen.

FIGS. 3-6 show user interface screens according to the invention. For convenience reasons, representations of an image to be printed and a media piece to be printed upon which are visible on the preview window 31 comprised in the user interface screens in FIGS. 3-6 are hereinafter referred to as "image" and "media piece" respectively.

Figure 3:
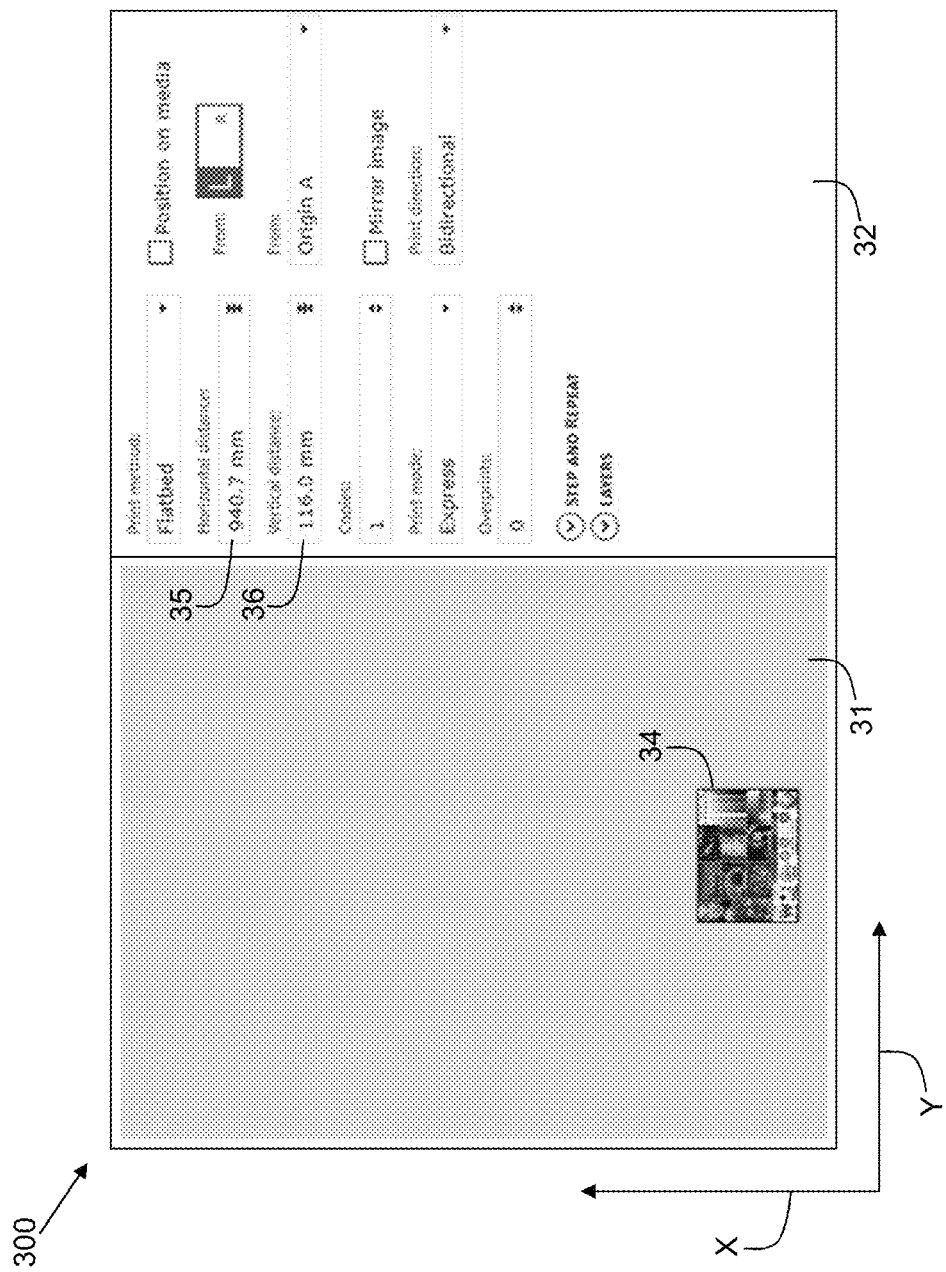
FIGS. 3-6 show user interface screens according to the invention.

FIG. 3 shows a user interface screen 300 comprising the preview window 31 and a parameter window 32. An image 34 is positioned on the grey color flatbed area according to a horizontal distance 35 and a vertical distance 36 from Origin A which is the bottom-left corner of the grey color flatbed area in the preview window 31.

Figure 4:
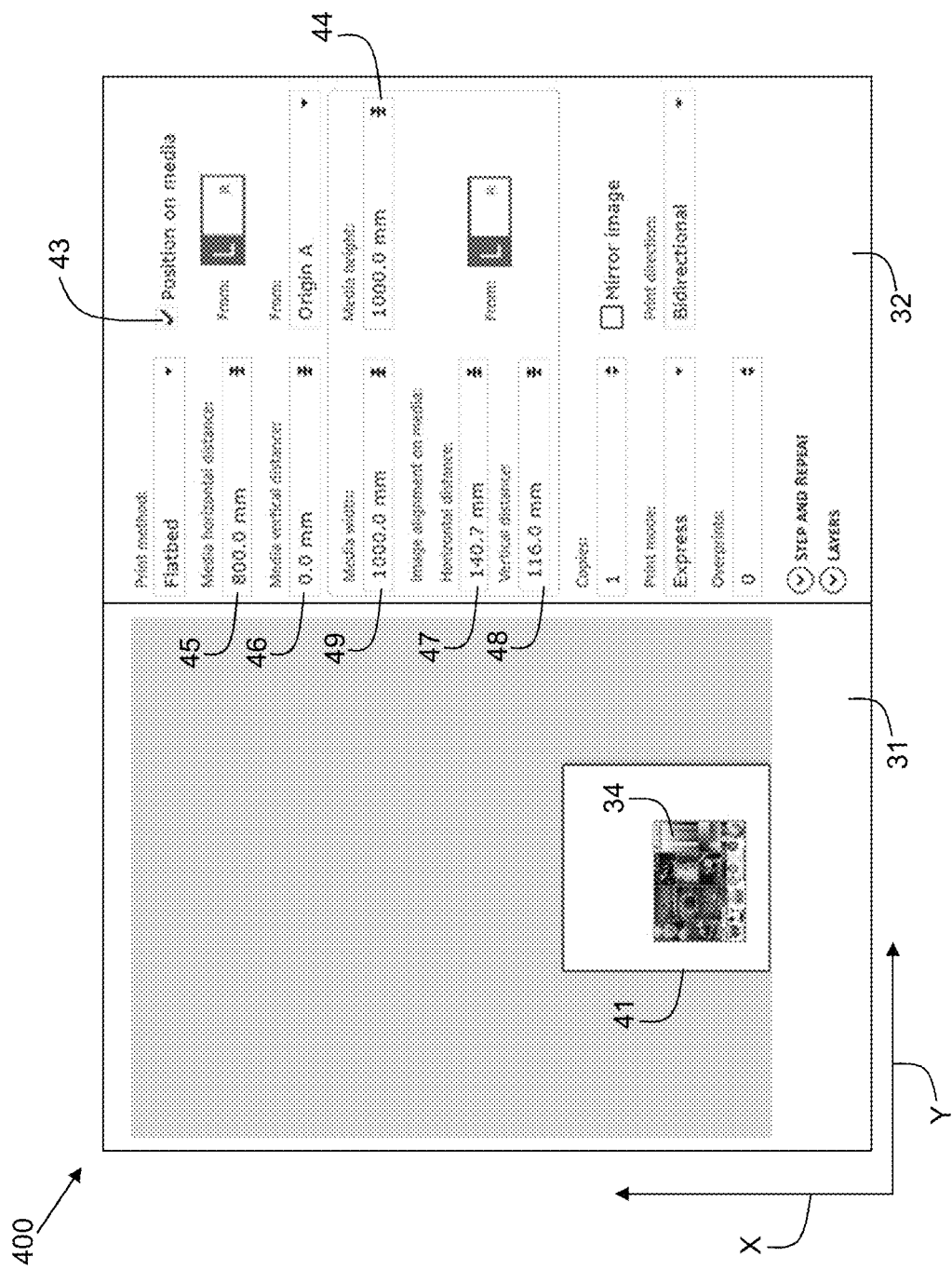

FIG. 4 shows a user interface screen 400 resembling the user interface screen 300 in FIG. 3. According to the present invention, when the operator ticks the new "Position on media" checkbox 43, a new set of parameters 44-49 appear, allowing to define the media size by means of the parameters 44, 49 and position on the flatbed surface by means of parameters 45, 46, and the image position relative to the media by means of the parameters 47, 48. In the preview window 31 an image 41 appears which represents the media piece at the position on the flatbed area set by the parameters 45, 46. In the preview window 31 the image 34 is now positioned on the media piece 41 at the position determined by the parameters 47, 48. The media piece 41 is displayed as a white rectangle with a blue border on the preview window 31, and the image 34 gets a grey border. The operator can now easily verify that the image 34 will be correctly positioned on the media piece 41. The operator can now directly read where the media piece 41 must be positioned on the flatbed table of the flatbed printer. Other colors may be envisioned and selected to achieve the same.

After moving the image 34 to another location on the flatbed area shown in the preview window 31, the operator can check that the image position on the media piece 41 is still correct, without having to perform mental calculations.

According to the present invention, the image positioning typically becomes a two-steps process of a first step of defining the media size and image position on media piece and a second step of defining the media position on the flatbed area.

Figure 5:
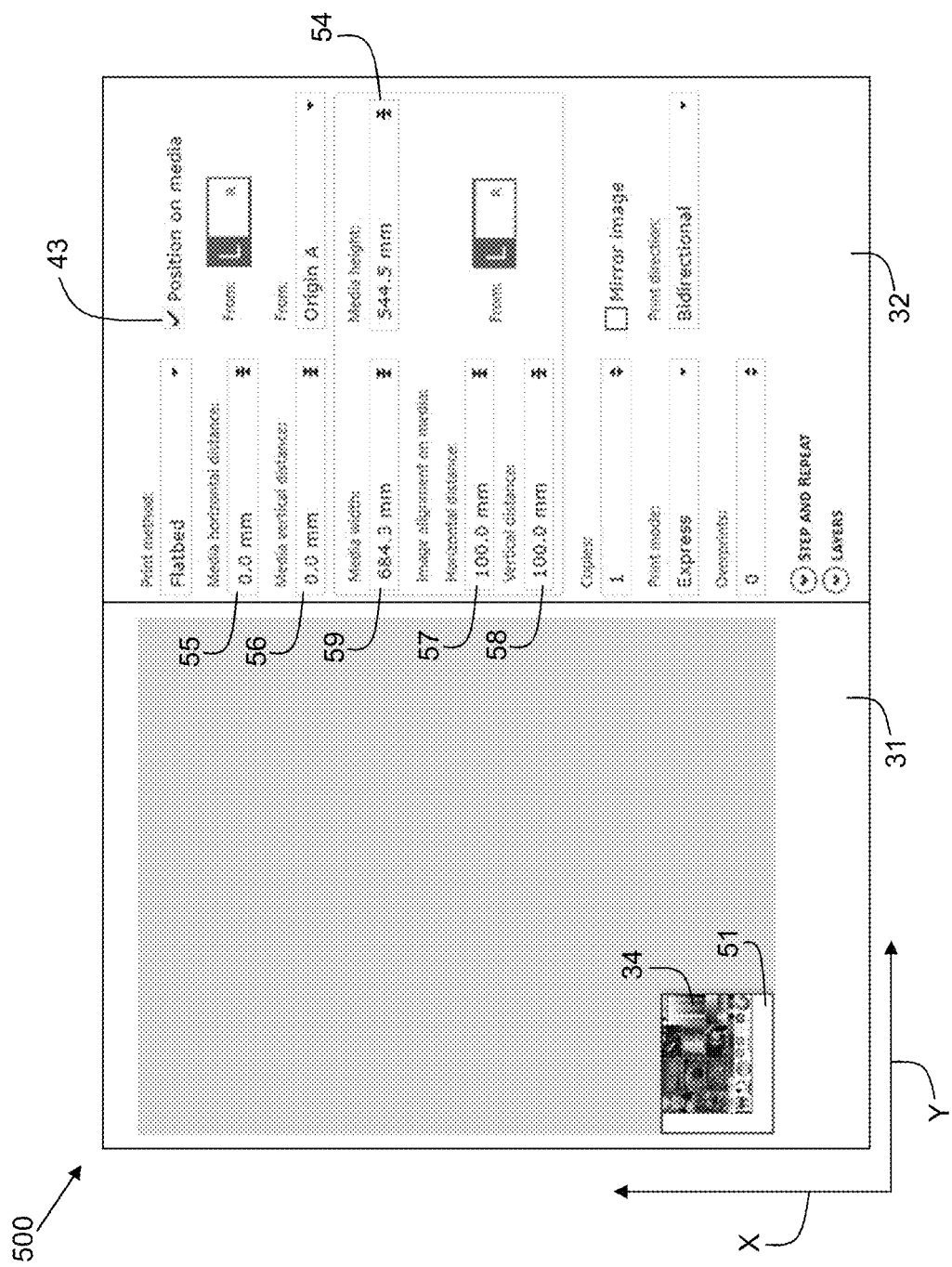

FIG. 5 shows a user interface screen 500 resembling the user interface screen 400 in FIG. 4. When a RIP sends the image 34 to the flatbed printer, according to an embodiment, the RIP defines an offset for the image 34 with respect to the origin of the table (bottom-left corner). When the operator selects the checkbox 43 labelled "Position on media", the print controller automatically infers a media size equal to the image size+the offset from the table origin as sent by the RIP, and positions the image 34 at that same offset from the media corner. FIG. 5 shows an example with an offset of (100, 100) with respect to the Origin A (bottom-left corner). A media piece 51 with the inferred media size appears on the preview window 31.

The operator can then edit the dimensions of the media piece 51 in the parameter window 32 and adjust the image position on the media piece 51 in the parameter window 32.

When dragging the image 34 on the preview window 31 or editing the "Media horizontal/vertical distance" parameters 55,56, the image 34 moves together with the media piece 51. The image position relative to the media piece 51 is preserved.

Figure 6:
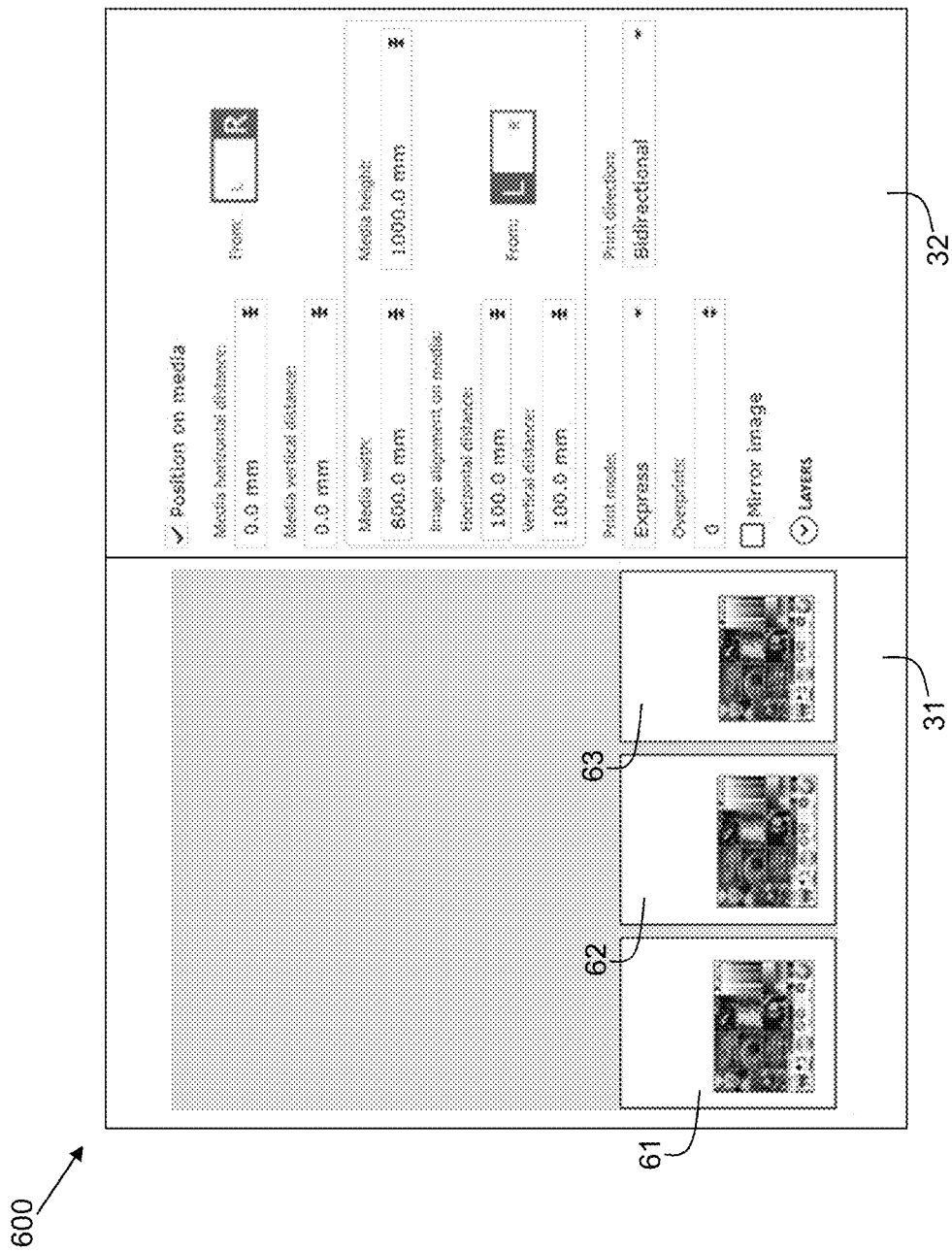

FIG. 6 shows a user interface screen 600 resembling the user interface screen 400 in FIG. 4. Once the operator has defined the size of the media piece and the image position of the image on the media piece, he will have the ability to copy the image 34 multiple times. Each copy 61, 62, 63 will them inherit the media dimensions and image position on the media. This allows easily printing the same image on multiple media pieces side-by-side, with exactly the same image-to-media positioning for each copy 61, 62, 63.

When the media dimensions are known, the media piece may be automatically filled with multiple copies of the image. According to an embodiment the print controller automatically arranges multiple—different—images on the media piece. According to an embodiment the print controller provide feedback on the user interface screen 300-600 about images extending outside of the media piece(s).

Figure 7:
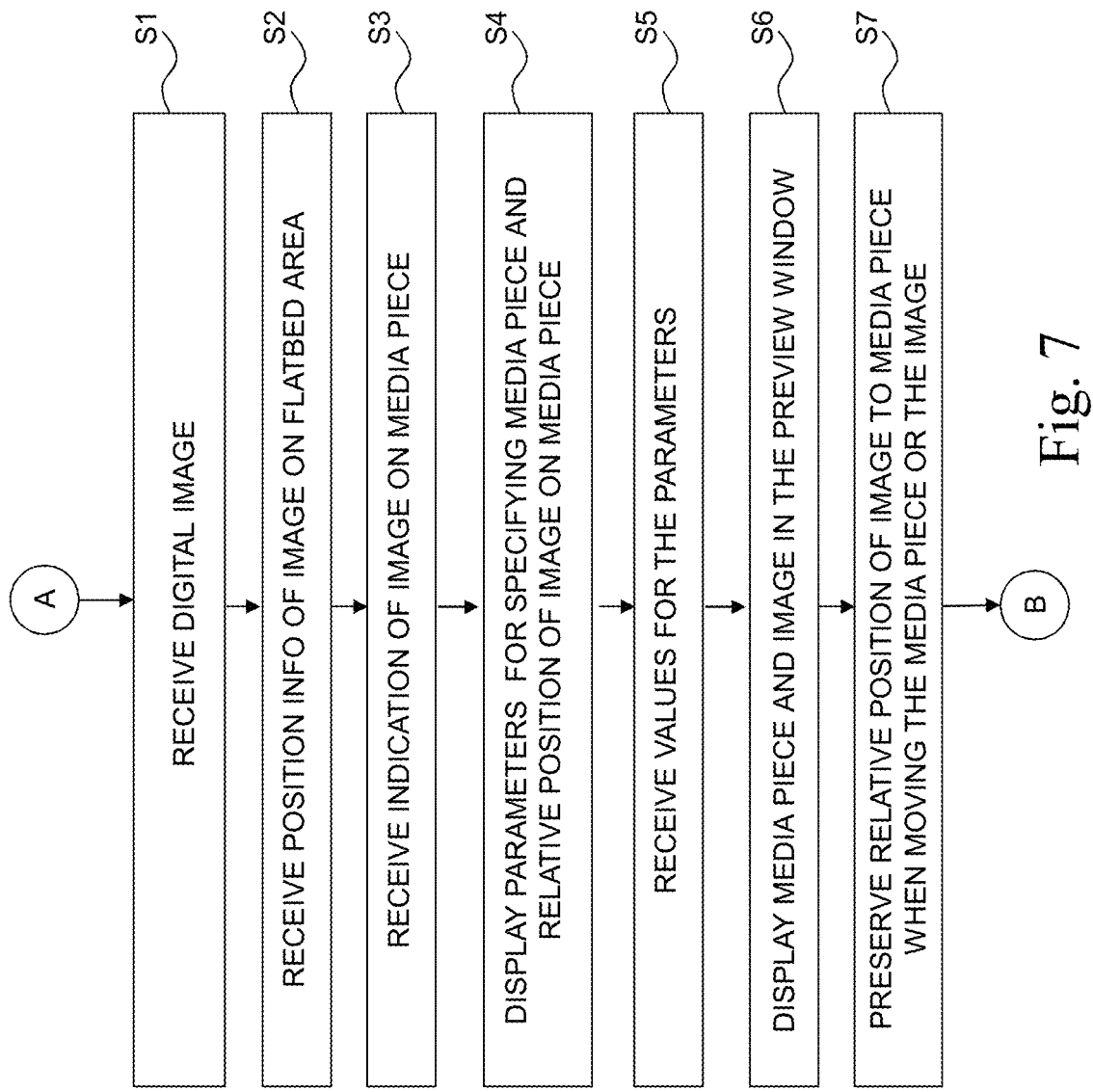
FIG. 7 is a schematic diagram of an embodiment of the method according to the invention.

FIG. 7 shows a flow diagram of an embodiment of the method according to the invention. Starting point of the method is point A. Point A leads to a first step S1.

In the first step S1 a digital image intended to be printed is received by the flatbed printer.

In a second step S2 position information is entered by means of the parameter window of the user interface of the position of the image on the flatbed area.

In a third step S3 an indication is entered by means of the parameter window of the user interface that the image has to be positioned on a media piece.

In a fourth step S4 a set of parameters is displayed in the parameter window allowing to define a size of the media piece and a position of the media piece on the flatbed surface, and the image position relative to the media piece.

In a fifth step S5 values for the set of parameters are entered by the operator.

In a sixth step S6 the media piece and the image are displayed on the flatbed area in the preview window.

In a seventh step S7, when moving the media piece or the image over the flatbed area in the preview window, the relative position of the image with respect to the media piece is preserved.

The user interface is also configured (not shown) to receive a start instruction for printing the image on the media piece by the flatbed printer. The print controller uses the values of the parameters set in the parameter window to create a data bitmap and print instructions to be sent to the print head. The print head ejects the recording material to form the image on the media piece at the entered and previewed position on the media piece and the flatbed area according to the data bitmap.

The method ends in an end point B.

According to an embodiment the print controller gets feedback from via the user interface of the printing system or via detection by sensors of the printing system that the media pieces have been laid down on the flatbed area, before the recording material is ejected towards the flatbed area.

The ejection of recording material may be started automatically by the print controller or manually via the user interface by the operator.

FIGS. 2-6 show user interface screen 300, 400, 500, 600 of the user interface of the flatbed printer according to the present invention. The user interface may be a local user interface attached to the flatbed printer. The user interface may be a remote user interface installed in storage or as a cloud service on a computer, PC, laptop, tablet pc, mobile phone, or any other mobile device with a display screen connected—wired or wireless—to the print controller of the flatbed printer.

The above disclosure is intended as merely exemplary, and not to limit the scope of the invention, which is to be determined by reference to the following claims.

The invention claimed is:

1. A flatbed printer comprising:
a flatbed area for placing media pieces to be printed upon;
a print controller for receiving at least one digital image to be printed on a media piece and controlling the printing of the at least one digital image on the media piece;
an armature constructed to move over the flatbed area in at least one direction;
a print head attached to the armature and configured to eject recording material on the media piece; and
a user interface comprising a preview window and a parameter window,
wherein the print controller is configured:
to receive a digital image intended to be printed by the flatbed printer;
to receive position information entered by the parameter window of the user interface of the position of the image on the flatbed area;
to receive an indication entered by the parameter window of the user interface that the image has to be positioned on the media piece;
to display in the parameter window a set of parameters allowing to define a size of the media piece and a position of the media piece on the flatbed surface, and the image position relative to the media piece;
to receive the entered set of parameters, parameters; and
to show the media piece and the image on the flatbed area in the preview window, and, when moving the media piece or the image over the flatbed area in the preview window or when editing the parameters defining the position of the media piece in the parameter window, the relative position of the image with respect to the media piece is preserved.

2. The flatbed printer according to claim 1, wherein the print controller is configured to receive the image ripped by a raster image processor which has defined an offset for the image with respect to an origin of the flatbed area, and, when the indication that the image has to be positioned on the media piece is received, to automatically infer a media size equal to the size of the image increased with the offset from the origin of the flatbed area, and to position the image at the same offset from a corner of the media piece.

3. The flatbed printer according to claim 1, wherein the print controller is configured to copy the image multiple times, wherein each copy inherits the dimensions of the media piece and the image position on the media piece.

4. The flatbed printer according to claim 1, wherein the print controller is configured to automatically fill, when the dimensions of the media piece are known, the media piece with multiple copies of the image.

5. The flatbed printer according to claim 1, wherein the print controller is configured to provide feedback on the user interface about images extending outside of the media piece.

6. A printing method for media-relative image positioning for a flatbed printer comprising a flatbed area for placing media pieces to be printed upon, a print controller for receiving at least one digital image to be printed on a media piece and controlling the printing of the at least one digital image on the media piece, an armature constructed to move over the flatbed area in at least one direction, a print head attached to the armature and configured to eject recording material on the media piece, and a user interface comprising a preview window and a parameter window, wherein the method comprises the steps of:
receiving a digital image intended to be printed by the flatbed printer;
receiving position information entered by the parameter window of the user interface of the position of the image on the flatbed area;
receiving an indication entered by the parameter window of the user interface that the image has to be positioned on the media piece;
displaying in the parameter window a set of parameters allowing to define a size of the media piece and a position of the media piece on the flatbed surface, and the image position relative to the media piece;
receiving entered values for the set of parameters; and
showing the media piece and the image on the flatbed area in the preview window, and, when moving the media piece or the image over the flatbed area in the preview window or when editing the parameters defining the position of the media piece in the parameter window, the relative position of the image with respect to the media piece is preserved.

7. The method according to claim 6, wherein the method comprises the steps of receiving the image ripped by a raster image processor which has defined an offset for the image with respect to an origin of the flatbed area, and, when the indication that the image has to be positioned on the media piece is received, automatically inferring a media size equal to the size of the image increased with the offset from the origin of the flatbed area, and positioning the image at the same offset from a corner of the media piece.

8. The method according to claim 6, wherein the method comprises the step of copying the image multiple times, wherein each copy inherits the dimensions of the media piece and the image position on the media piece.

9. The method according to claim 6, wherein the method comprises the step of automatically filling, when the dimensions of the media piece are known, the media piece with multiple copies of the image.

10. The method according claim 6, wherein the method comprises the step of providing feedback on the user interface about images extending outside of the media piece in the preview window.

11. A non-transitory recording medium comprising computer executable program code configured to instruct a computer to perform the method according to claim 6.

* * * * *